(12) United States Patent
Sato

(10) Patent No.: US 9,556,969 B2
(45) Date of Patent: Jan. 31, 2017

(54) VALVE DEVICE AND SHOWER DEVICE USING THE SAME

(71) Applicant: Hirohiko Sato, Takarazuka (JP)

(72) Inventor: Hirohiko Sato, Takarazuka (JP)

( * ) Notice: Subject to any disclaimer, the term of this patent is extended or adjusted under 35 U.S.C. 154(b) by 0 days.

(21) Appl. No.: 14/781,725

(22) PCT Filed: Mar. 4, 2014

(86) PCT No.: PCT/JP2014/055402
§ 371 (c)(1),
(2) Date: Oct. 1, 2015

(87) PCT Pub. No.: WO2014/162808
PCT Pub. Date: Oct. 9, 2014

(65) Prior Publication Data
US 2016/0061346 A1     Mar. 3, 2016

(30) Foreign Application Priority Data

Apr. 5, 2013  (JP) .................. 2013-079271

(51) Int. Cl.
*B05B 1/18*     (2006.01)
*B05B 1/16*     (2006.01)
(Continued)

(52) U.S. Cl.
CPC .............. *F16K 35/04* (2013.01); *B05B 1/12* (2013.01); *B05B 1/1609* (2013.01);
(Continued)

(58) Field of Classification Search
CPC ........ B05B 1/12; B05B 1/1609; B05B 1/1627; B05B 1/1636; B05B 1/18; B05B 1/185; B05B 1/3026; B05B 1/32; F16K 5/0647; F16K 31/602; F16K 35/04; E03C 1/02; E03C 1/0405; E03C 1/0409
See application file for complete search history.

(56) References Cited

U.S. PATENT DOCUMENTS

2005/0156062 A1* 7/2005 Thomas ................. E03C 1/084
                                                    239/548
2010/0133364 A1* 6/2010 Chen ..................... B05B 1/1609
                                                    239/587.5
(Continued)

FOREIGN PATENT DOCUMENTS

JP      08-275900 A     10/1996
JP      11-104524 A      4/1999
JP    2013-070889 A      4/2013

OTHER PUBLICATIONS

International Search Report mailed May 27, 2014, issued for PCT/JP2014/055402.

*Primary Examiner* — Darren W Gorman
(74) *Attorney, Agent, or Firm* — Locke Lord LLP

(57) ABSTRACT

Each of the valve device and the shower device includes: a valve/shower device main body; a link lever pivotally held in the valve/shower device main body; a weight provided on the link lever; and a ball valve provided between the weight and a pivot axis of the link lever. When the valve/shower device main body is manually caused to move by shaking, swinging, turning, tilting, tapping, or like operation, a kinetic energy imposed on the weight causes the link lever to make a rotational movement relative to the valve/shower device main body, and then the rotational movement of the link lever displaces the ball valve to open or close a valve hole. The valve device and the shower device can significantly facilitate the valve-opening/closing operations, and do not require a special external member for hand- or finger-operation such as a button, a handle or a switch.

20 Claims, 15 Drawing Sheets

(51) Int. Cl.
*B05B 1/12* (2006.01)
*F16K 5/06* (2006.01)
*F16K 35/04* (2006.01)
*B05B 1/32* (2006.01)
*B05B 1/30* (2006.01)
*E03C 1/02* (2006.01)
*F16K 31/60* (2006.01)
*E03C 1/04* (2006.01)

(52) U.S. Cl.
CPC .......... *B05B 1/1627* (2013.01); *B05B 1/1636* (2013.01); *B05B 1/18* (2013.01); *B05B 1/185* (2013.01); *B05B 1/3026* (2013.01); *B05B 1/32* (2013.01); *E03C 1/02* (2013.01); *E03C 1/0405* (2013.01); *E03C 1/0409* (2013.01); *F16K 5/0647* (2013.01); *F16K 31/602* (2013.01)

(56) References Cited

U.S. PATENT DOCUMENTS

| | | | | |
|---|---|---|---|---|
| 2011/0114752 A1* | 5/2011 | Li | ..................... | B05B 1/1609 |
| | | | | 239/222.11 |
| 2012/0312403 A1* | 12/2012 | Zhou | ................... | B05B 1/1609 |
| | | | | 137/861 |
| 2013/0032645 A1* | 2/2013 | Zhou | ................... | B05B 1/1609 |
| | | | | 239/436 |

* cited by examiner

VALVE DEVICE AND SHOWER DEVICE USING THE SAME

TECHNICAL FIELD

The present invention relates to a valve device and a shower device using the same to be used for a bathroom shower head, a kitchen shower faucet, a shower head for barbers and hair salons, an outdoor/horticultural sprinkler, etc.

BACKGROUND ART

Shower devices include shower heads for use in bathrooms of hotels/general homes or in hot springs, bathhouses, etc., shower heads for use in barbers and hair salons, shower faucets for use in washrooms and kitchens, sprinklers for gardening and horticultural use, and the like. Among the known shower devices, a shower device with a built-in valve has a water passage provided in a device main body and having a valve hole in the water passage, in which the valve hole is opened and closed by means of a valve body such as a ball valve by operation of an external operation unit such as a button.

For example, Patent Literature 1 discloses a shower head with a hand-operable water stop valve. In this hand switch-type shower head, the valve body is caused to move by finger operation of a push button on the main body of the shower head, thereby closing the valve hole and temporarily stopping the spray action of shower water. This shower head can save water.

Patent Literature 2 discloses a shower head which can change over its spray patterns. When a user externally operates a rocker-type change-over button, a ball valve as a change-over valve is caused to move and change over the fluid passage, thereby changing the spray action between straight flow and shower spray.

PRIOR ART DOCUMENTS

Patent Literature

[Patent Literature 1] JP H11-104524 A
[Patent Literature 2] JP H08-275900 A

DISCLOSURE OF THE INVENTION

Problems to be Solved by the Invention

Regarding these conventional shower devices, in order to displace the valve body from the valve-open state to the valve-closed state or from the valve-closed state to the valve-open state, the movement of the valve body is forced by an external operation. For example, the ball valve is caused to move by finger operation of a push button in Patent Literature 1, and by operation of a rocker button in Patent Literature 2.

However, in order to operate the external button of such a shower device without fail, the external button needs to be operated by both hands, or by finger operation while holding the shower device in the same hand. Such hand/finger operations are difficult.

Besides, the arrangement for moving the valve body by a direct external action requires a button and a transmission component for transmitting the button movement. These additional components increase the total number of components in the shower device, and complicate the manufacture and assembly of the shower device.

In view of the above circumstances, an object of the present invention is to provide a valve device and a shower device using the same which can significantly facilitate the valve-opening/closing operations, which do not require a special external member for hand- or finger-operation such as a button, a lever, a handle, a knob or a switch, and which further do not require a transmission member to be linked therewith, thereby realizing a simple structure, simple manufacture, and simple assembly.

Means for Solving the Problems

In order to solve the above-mentioned problems, the invention according to claim 1 relates to a valve device which includes a valve device main body, a fluid passage provided in the valve device main body and having a valve hole, and a valve body for opening and closing the valve hole. The valve device further includes a link lever which is pivotally held in the valve device main body and which is equipped with a weight serving as a point of effort. The valve body is provided at such a position that a distance between a pivot point of the link lever and the valve body is shorter than a distance between the weight and the pivot point of the link lever. When the valve device main body is caused to move, the movement of the valve device main body causes the weight to make a relative movement to the valve device main body; the movement of the weight causes the link lever to make a rotational movement; and the rotational movement of the link lever causes a movement of the valve body to open or close the valve hole.

The invention according to claim 2 relates to a shower device which includes a shower device main body, a water passage provided in the shower device main body and having a valve hole, and a valve body for opening and closing the valve hole. The shower device further includes a link lever which is pivotally held in the shower device main body and which is equipped with a weight serving as a point of effort. The valve body is provided at such a position that a distance between a pivot point of the link lever and the valve body is shorter than a distance between the weight and the pivot point of the link lever. When the shower device main body is caused to move, the movement of the shower device main body causes the weight to make a relative movement to the shower device main body; the movement of the weight causes the link lever to make a rotational movement; and the rotational movement of the link lever causes a movement of the valve body to open or close the valve hole.

The invention according to claim 3 relates to a shower device which includes: a shower device main body having a spray portion, the spray portion including a central high-speed spray zone and a peripheral shower spray zone; a passage for supplying water to each of the high-speed spray zone and the shower spray zone, having a valve hole provided at a part communicating to the shower spray zone; and a valve body for opening and closing the valve hole. When the valve body opens the valve hole, the shower device allows water to flow out from both of the high-speed spray zone and the shower spray zone. When the valve body closes the valve hole, the shower device allows water to flow out only from the high-speed spray zone. The shower device further includes a link lever which is pivotally held in the shower device main body and which is equipped with a weight serving as a point of effort. The valve body is provided at such a position that a distance between a pivot point of the link lever and the valve body is shorter than a distance between the weight and the pivot point of the link lever. When the shower device main body is caused to move, the movement of the shower device main body causes the weight to make a relative movement to the shower device main body; the movement of the weight causes the link lever to make a rotational movement; and the rotational movement of the link lever causes a movement of the valve body to open or close the valve hole.

The invention according to claim 4 relates to the valve device according to claim 1, wherein the valve body is a ball valve which is held by the link lever in a freely movable manner, the ball valve moving integrally along with the rotational movement of the link lever and being detachably seated in the valve hole at a position facing the valve hole.

The invention according to claim 5 relates to the valve device according to claim 1 or 4, further including a regulating means which prevents, even if the valve device main body is caused to move while the valve body is at a valve-open position, an unwanted rotational movement of the link lever and an associated movement of the valve body toward the valve hole.

The invention according to claim 6 relates to the valve device according to claim 5, wherein the regulating means includes a latch pin and a latch recess. The latch pin is provided on either of the link lever or the valve device main body and has a biasing means. The latch recess is provided in the other one of the link lever or the valve device main body. The latch pin latches detachably in the latch recess.

The invention according to claim 7 relates to the valve device according to claim 5, wherein the regulating means includes at least one magnet by which either of the link lever or the weight and the valve device main body are magnetically attracted to each other.

The invention according to claim 8 relates to the valve device according to claim 5, wherein the regulating means includes a spring member which biases the link lever constantly in the valve-opening direction, irrespective of whether the valve body is at the valve-open position or at a valve-closed position.

The invention according to claim 9 relates to the shower device according to claim 2 or 3, wherein the valve body is a ball valve which is held by the link lever in a freely movable manner, the ball valve moving integrally along with the rotational movement of the link lever and being detachably seated in the valve hole at a position facing the valve hole.

The invention according to claim 10 relates to the shower device according to any one of claims 2, 3, and 9, further including a regulating means which prevents, even if the shower device main body is caused to move while the valve body is at a valve-open position, an unwanted rotational movement of the link lever and an associated movement of the valve body toward the valve hole.

The invention according to claim 11 relates to the shower device according to claim 10, wherein the regulating means includes a latch pin and a latch recess. The latch pin is provided on either of the link lever or the shower device main body and has a biasing means. The latch recess is provided in the other one of the link lever or the shower device main body. The latch pin latches detachably in the latch recess.

The invention according to claim 12 relates to the shower device according to claim 10, wherein the regulating means includes at least one magnet by which either of the link lever or the weight and the shower device main body are magnetically attracted to each other.

The invention according to claim 13 relates to the shower device according to claim 10, wherein the regulating means includes a spring member which biases the link lever constantly in the valve-opening direction, irrespective of whether the valve body is at the valve-open position or at a valve-closed position.

In the invention according to claims 1 to 13, the phrase "the valve device main body or the shower device main body is caused to move" means that the valve/shower device main body is caused to move by user's hand-operation, such as by shaking, swinging, turning, tilting, or tapping the main body; namely, that a kinetic energy is manually given to the valve/shower device main body.

When the valve/shower device main body is operated by shaking, swinging, turning, tilting, tapping, etc., the weight makes a relative movement to the valve/shower device main body by inertia or gravity. Namely, when a kinetic energy is given to the valve/shower device main body in the above-described manner, the weight moves independently of the valve/shower device main body by inertia or gravity.

To put it the other way around, the valve/shower device main body is manually shaken, swung, turned, tilted, tapped or operated otherwise in such a manner as to give the weight a kinetic energy which causes the weight to move independently of the valve/shower device main body by inertia or gravity.

When the valve device main body or the shower device main body is caused to move widely, strongly, quickly or violently, the weight moves independently of the valve/shower device main body by greater inertia or gravity. This movement is transmitted to the link lever and causes the link lever to rotate around the pivot point. As a result, the valve body provided on the link lever moves relative to the valve/shower device main body.

In this case, according to the principle of the link mechanism, the weight acts as the point of effort of the link lever, the pivot point acts as the fulcrum of the link lever, and the valve body acts as the point of load of the link lever. If the distance between the pivot point (fulcrum) and the valve body (point of load) is shorter than the distance between the weight (point of effort) and the pivot point (fulcrum), the force given to the valve body increases in proportion to the ratio of the distances. Hence, the force given to the valve body gets greater than the one given to the weight, thereby causing the valve body to move easily.

In claims 4 and 9, the phrase "the ball valve is held by the link lever in a freely movable manner" means that the ball valve can move freely relative to the link lever, and specifically means that the ball valve is embraced by the link lever in such a manner as to move integrally in coordination with the movement of the link lever.

In claims 5 and 10, the valve-open position of the valve body means a position at which the valve body keeps the valve hole open.

Claims 7 and 12 mention at least one magnet by which either of the link lever or the weight and the valve/shower device main body are attracted to each other. In this context, the magnet may include a magnet on one side and a magnet on the other side, or the magnet may include a magnet on one side and a magnetic material on the other side.

Effects of the Invention

According to the invention according to any one of claims 1 to 3, while the valve body is in the valve-open state, if the valve device main body or the shower device main body is manually caused to move by shaking, swinging, turning, tilting, tapping, or by like operation, inertia or gravity acts on the weight and causes the weight to make a relative movement to the valve/shower device main body. This movement causes the link lever to rotate and to displace the valve body located between the weight and the pivot point. When the valve body reaches a position facing the valve hole, the valve body is seated in the valve hole to close the valve hole and to stop the flow of liquid.

While the valve body is in the valve-closed state, if the valve device main body or the shower device main body is manually caused to move in the opposite direction by shaking, swinging, turning, tilting, tapping, or by like operation, inertia or gravity acts on the weight and causes the weight to move independently of the valve/shower device main body. This movement causes the link lever to rotate and displaces the valve body along with the rotation of the link lever. Eventually, the valve body leaves the valve hole and opens the valve hole.

Thus, it is possible to open and close the valve hole by displacing the valve body by user's simple operation such as by shaking, swinging, turning, tilting, or tapping the valve device main body or the shower device main body. Unlike the conventional devices, the present invention requires neither a special external operation member such as a button, a lever, a handle or a switch, nor a transmission member to be linked therewith. The basic structure of the present invention is composed of a valve device main body having a valve hole, a link lever, a weight and a valve body, and this simple structure contributes to simple manufacture and simple assembly.

According to the valve structure of this type, the valve body is provided upstream of the valve hole. In the state where the liquid supply valve is open and the valve hole is closed, fluid pressure from the fluid supply source acts on the valve body, so that the valve body is pressed against the valve seat by back pressure. Hence, the force required to displace the valve body is greater in the valve-opening operation than in the valve-closing operation.

As mentioned above, the present invention utilizes the link mechanism, which can increase a force given to the weight and can transmit the force to the valve body by moving the valve/shower device main body. Eventually, even in the valve-closed state with a high resistance, the valve body can be easily displaced in the valve-opening direction.

Also in this regard, if the link lever is rotated (i.e. the valve body is displaced) in a direction crossing the valve-hole opening direction, the force for moving the link lever is smaller due to a smaller water resistance than in the case where the link lever is rotated (i.e. the valve body is displaced) against the flow to the valve hole.

According to the invention of claim 3, in the state where the valve body opens the valve hole, water is sprayed from both of the high-speed spray zone and the shower spray zone. Hence, just as a standard shower head, the shower head of the present invention can spray water to a relatively large area such as the head and the body.

On the other hand, in the valve-closed state where the valve body closes the valve hole, water is sprayed only from the central high-speed spray zone and not from the peripheral shower spray zone. Compared with the case where water is sprayed from both of the high-speed spray zone and the shower spray zone, the spray action in the valve-closed state provides a smaller total opening area, reduces the amount of water to be sprayed, and advantageously saves water. In addition, the spray action in the valve-closed state occurs under an increased internal pressure and sprays water more powerfully, thus being effective for shampooing because a powerful spray is more likely to reach scalp pores.

For the above-mentioned reasons, the present invention is effectively applicable to not only a shower head for use in general homes but also a shower head for use in hot springs and bathhouses or a shower head for use in barbers and hair salons.

As the valve body, the invention of claims 4 and 9 employs a ball valve, which is held between the weight and the pivot point of the link lever in a freely movable manner. This structure allows smooth movement of the ball valve. Besides, when the ball valve is subjected to water pressure during the valve-closing process and is pressed against the valve seat such as an O-ring, the ball valve makes a tight contact with the valve seat and shows an excellent sealing property for stopping the liquid from flowing into the valve hole.

According to the invention of claims 5 and 10, the link lever is provided with a regulating means for preventing an unintentional swing of the link lever in the direction of the valve hole. As a result, even if the valve/shower device main body is caused to move while the valve body is in the valve-open position, it is possible to prevent unintentional activation of the mechanism.

For example, when a person takes a shower or sprinkles water, the user frequently operates the shower device in some way (e.g. moves the shower device to change the spray direction). In use, it is undesirable for the valve body to move unexpectedly from the valve-open position to the valve-closed position or from the valve-closed position to the valve-open position along with the movement of the shower device. Hence, the invention of claims 5 and 10 employs a regulating means which prevents unwanted movement of the valve body to the valve-closed position or to the valve-open position, as far as the movement of the valve device and the shower device in the valve-open state is so small as to fail to displace the weight. In the normal state of use during which opening or closing of the valve body is undesirable, even when a user moves the valve/shower device main body (namely, even when the user makes a small or weak operation such as shaking, swinging, turning, tilting, tapping, etc.), the regulating means can prevent unwanted closure of the valve hole.

The regulating means can be realized by a barrier means such as a spring which hampers the rotation of the link lever in the valve-closing direction or a slope which gives a sliding frictional resistance.

When the valve body needs to be closed, the valve/shower device main body is operated widely or strongly by shaking, swinging, turning, tilting, tapping or otherwise, thereby giving a large kinetic energy to the weight and causing the link lever to rotate against the resistance of the regulating means.

As the regulating means, the invention of claims 6 and 11 employs an engagement structure composed of a latch pin and a latch recess with use of a spring or other biasing means. The invention of claims 7 and 12 employs at least one magnet by which either of the link lever or the weight and the valve/shower device main body are attracted to each other. These arrangements can prevent an unintentional rotation of the link lever by a simple structure.

Furthermore, the invention of claims 8 and 13 employs a spring member which biases the link lever constantly in the valve-opening direction, irrespective of whether the valve body is at the valve-open position or at the valve-closed position. Even if the valve body at the valve-closed position is subjected to water pressure (fluid pressure), the spring member can help the valve body to open easily, and can also prevent an unwanted rotation of the link lever in the valve-open orientation.

MODE FOR CARRYING OUT THE INVENTION

Figure 1:
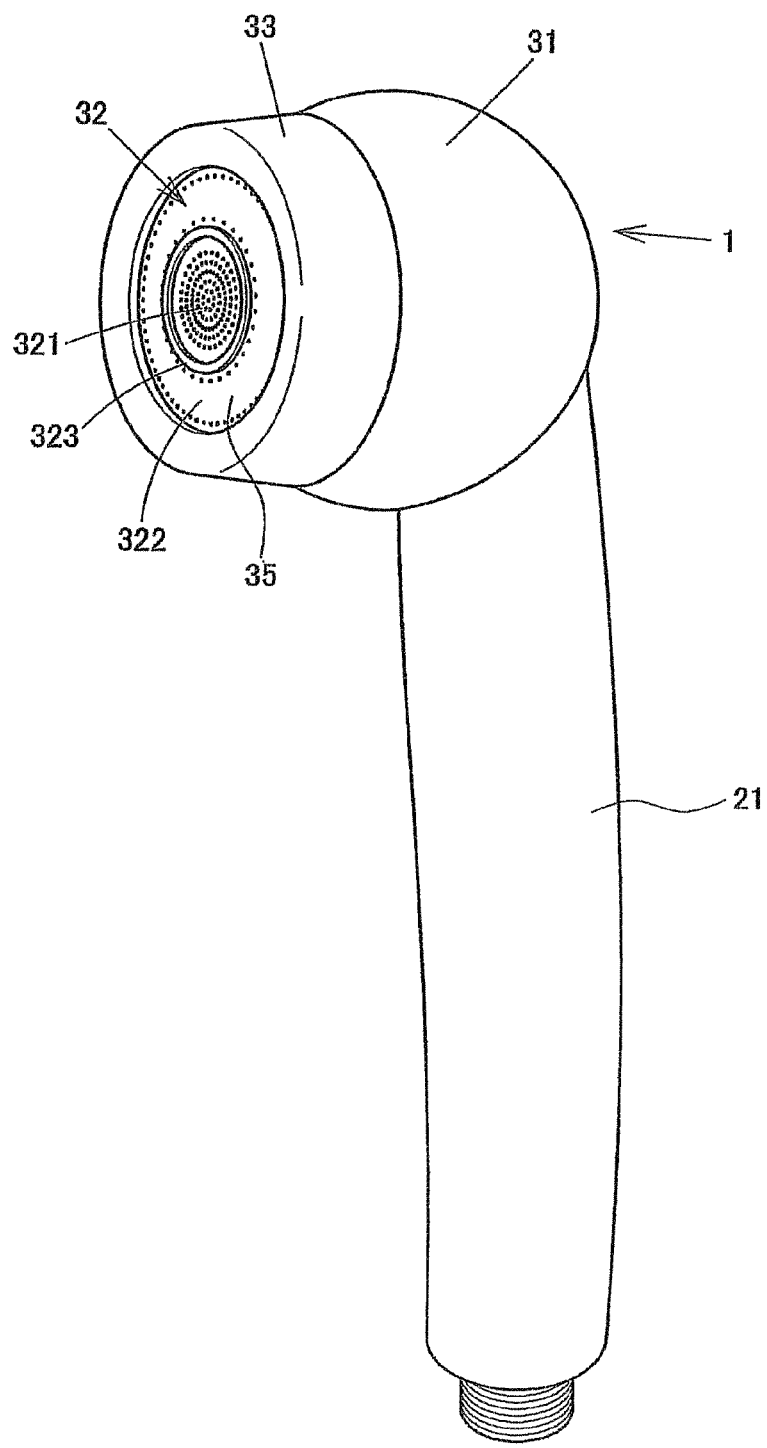
FIG. 1 is a perspective view of the entire shower device in the first embodiment of the present invention.
Figure 2:
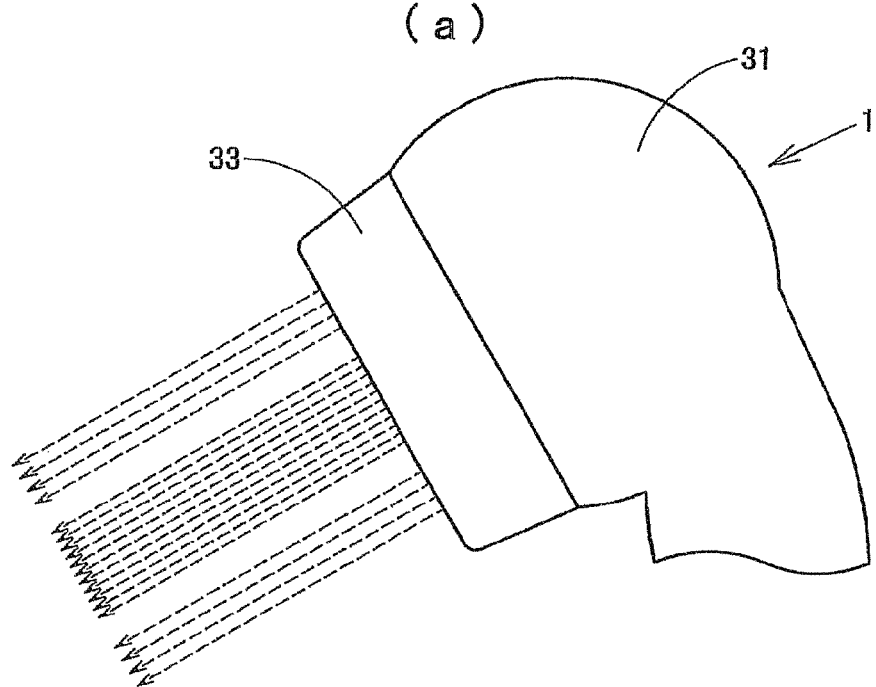
FIGS. 2(a) and 2(b) are side views which illustrate different spray patterns of the shower device in the first embodiment.
Figure 2:
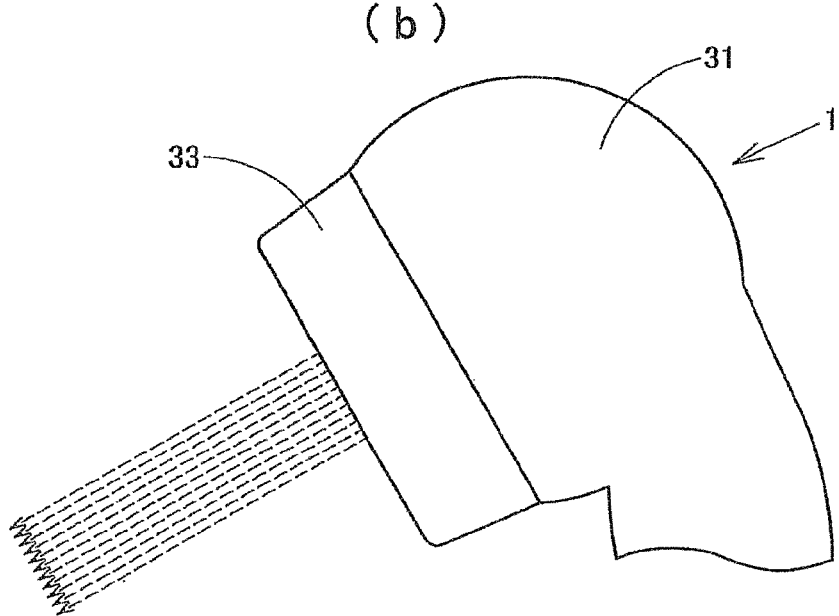
Figure 3:
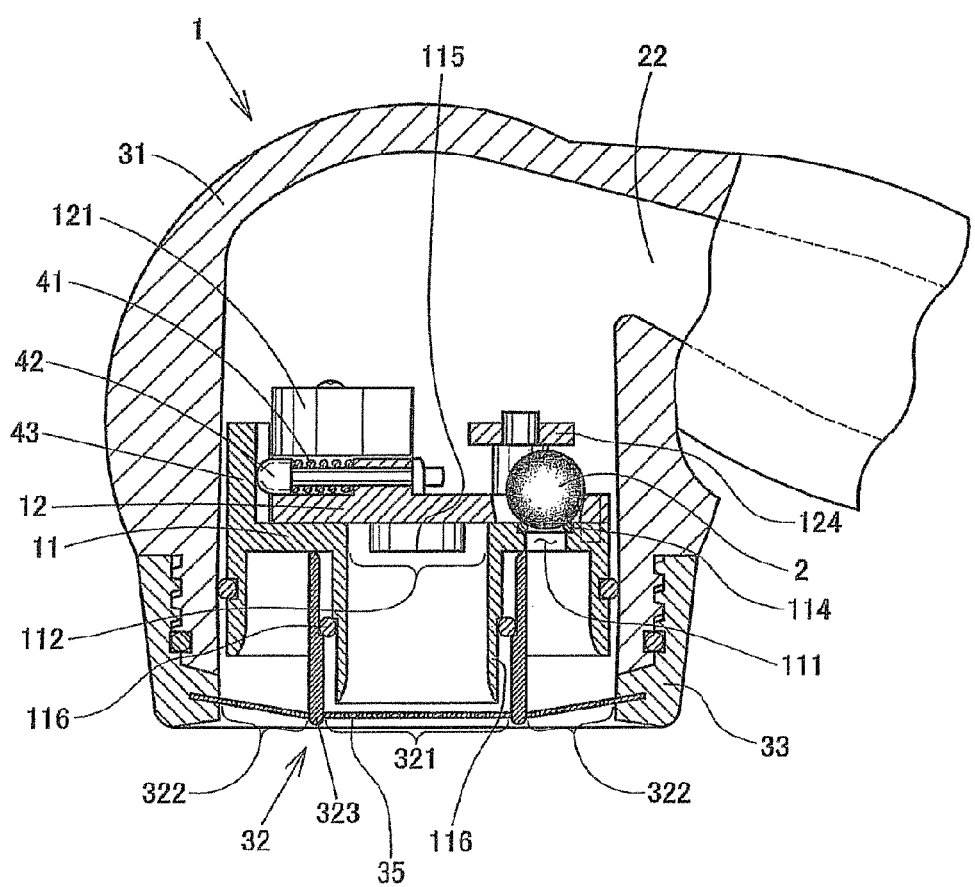
FIG. 3 is a partial sectional view of the shower device in the first embodiment.
Figure 4:
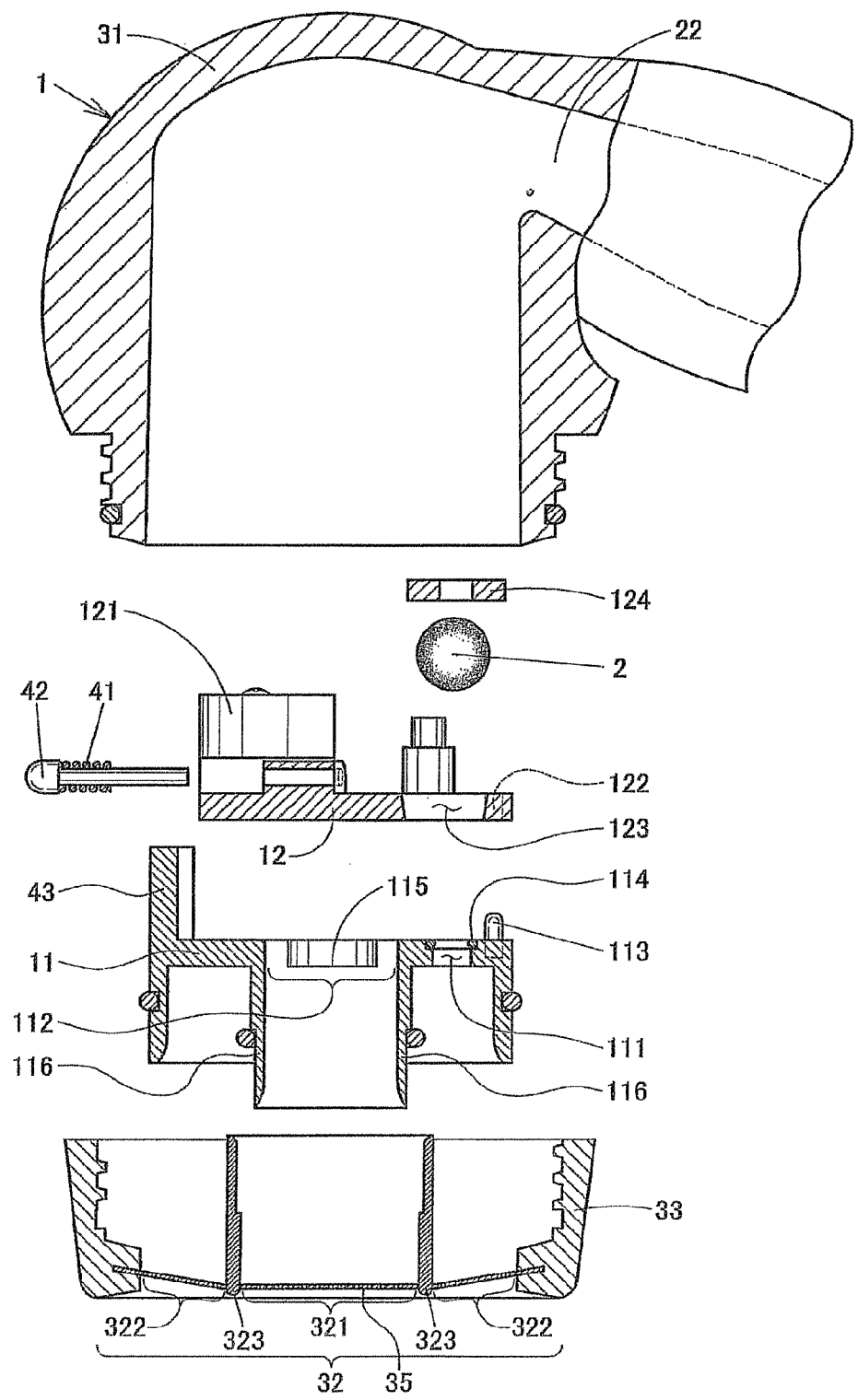
FIG. 4 is an exploded sectional view of the shower device in the first embodiment.
Figure 5:
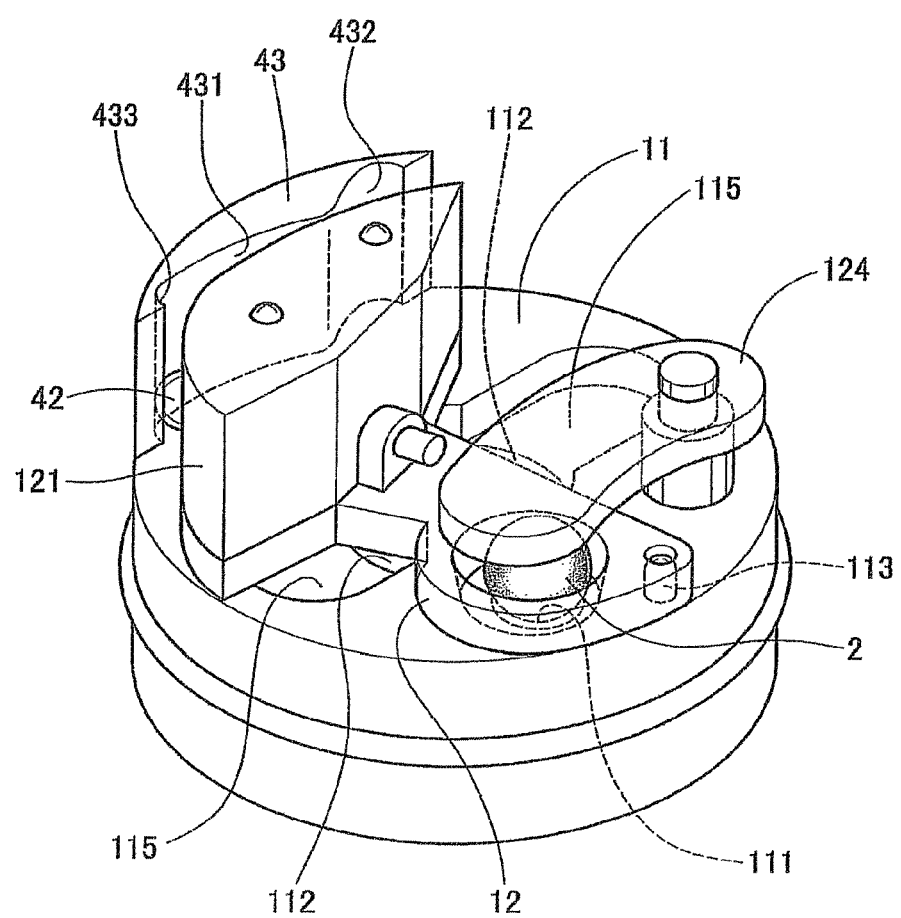
FIG. 5 is a perspective view of a principal part of the shower device in the first embodiment.
Figure 6:
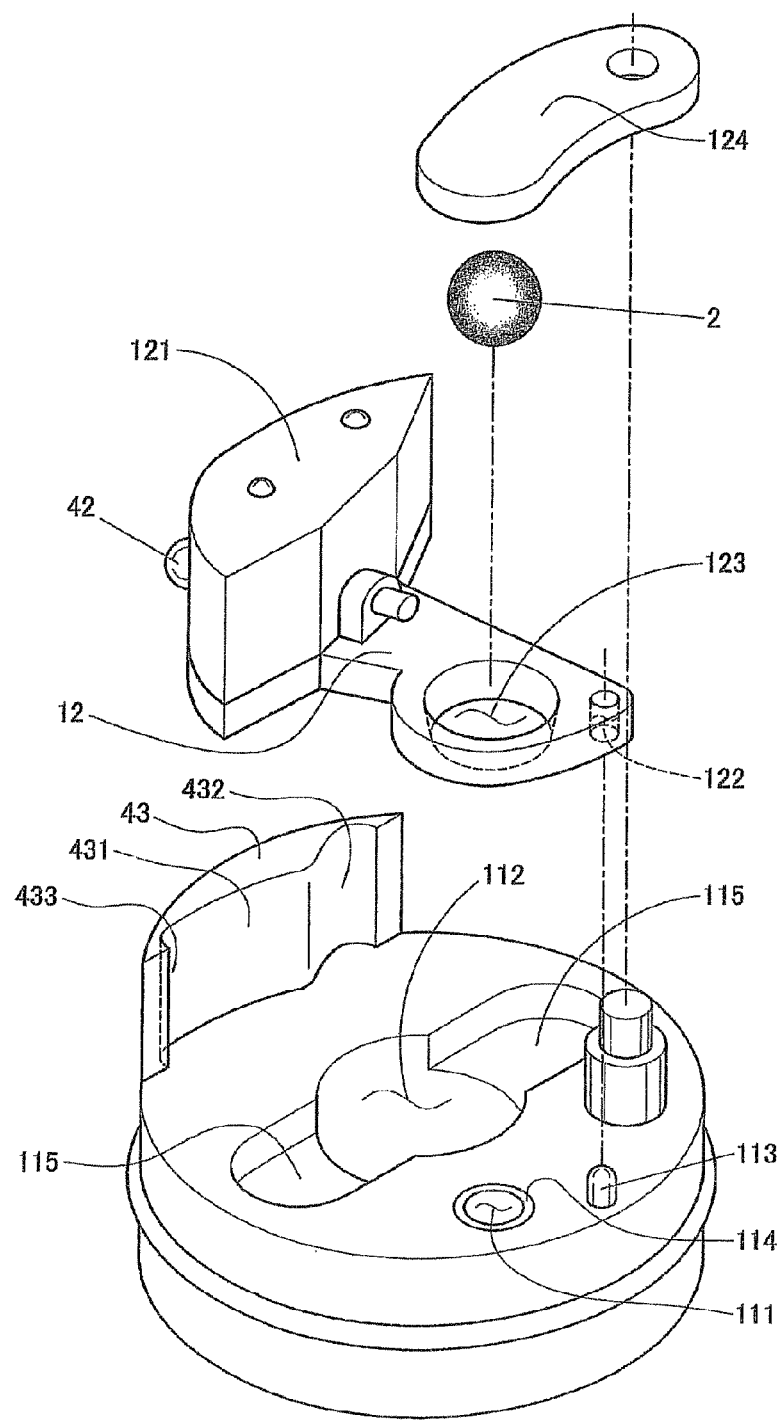
FIG. 6 is an exploded perspective view of the principal part of the shower device in the first embodiment.
Figure 7:
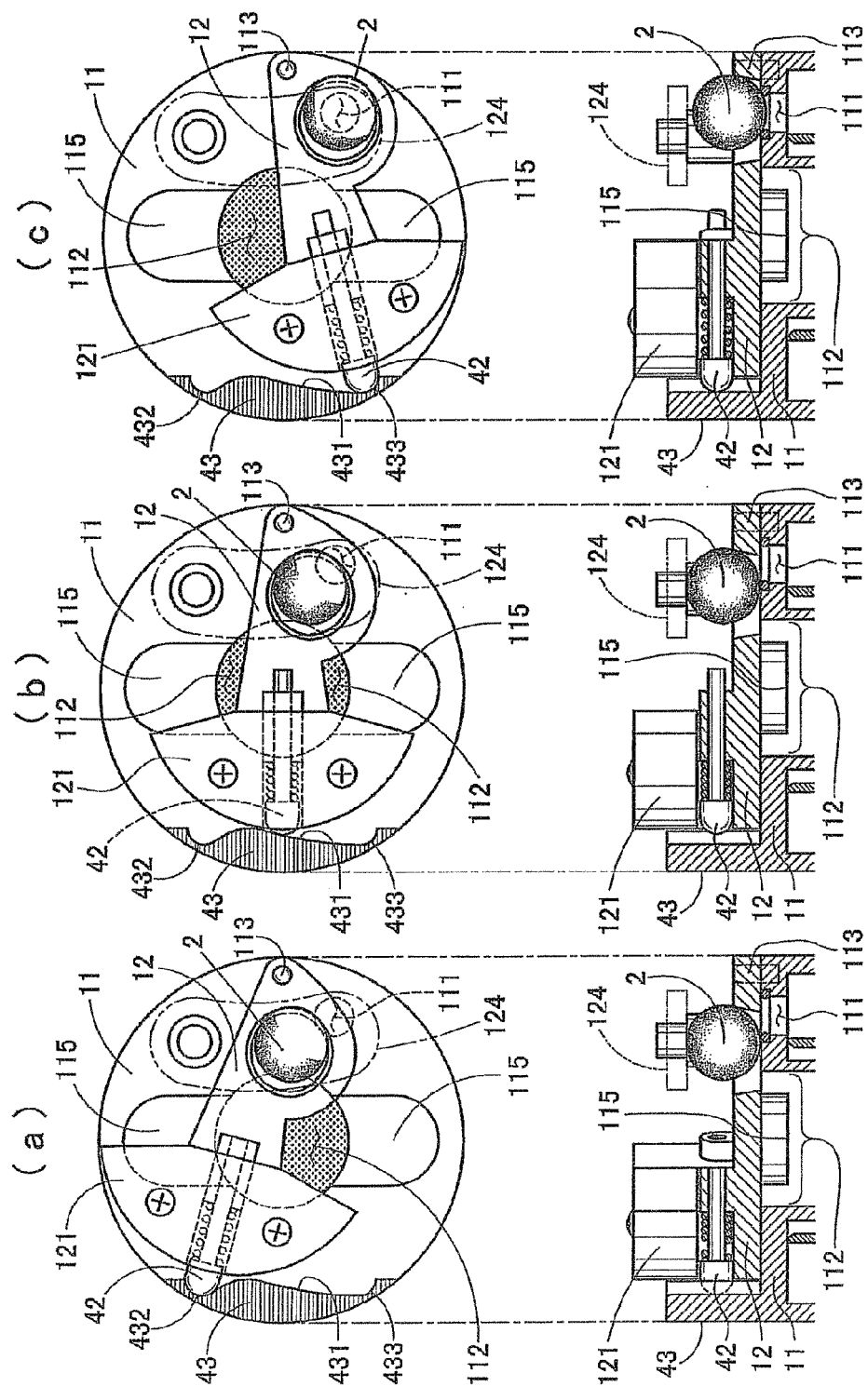
FIGS. 7(a)-(c) are plan views and sectional views showing the valve-open state and the valve-closed state of the shower device in the first embodiment.

Referring to FIGS. 1 to 15, embodiments of the shower device according to the present invention are hereinafter described in detail. While the following embodiments provide specific examples preferred to practice the invention and include various technical limitations, the present invention should not be limited to these embodiments unless otherwise stated below.

First Embodiment

A shower device in the first embodiment, shown in FIGS. 1 to 7, is an example of a shower head to be used in bathrooms of hotels/general homes or in hot springs, bathhouses, etc. Reference numeral 1 indicates a shower device main body. The shower device main body 1 includes a grip portion 21 and a head portion 31 which are formed in one piece, with a water passage 22 running through the grip portion 21 and the head portion 31. The head portion 31 is provided with a spray portion 32.

The spray portion 32 includes a spray plate 35 made of stainless-steel, a cylindrical compartment cylinder 323 made of synthetic resin, and a cap 33 made of synthetic resin.

The spray plate 35 includes a central high-speed spray zone 321 in which spray holes composed of multiple small holes are concentrated, and a peripheral shower spray zone 322 in which spray holes composed of multiple small holes are annularly arranged in rows. At the border of the high-speed spray zone 321 and the shower spray zone 322, the compartment cylinder 323 is integrally formed by insert molding. The cap 33 is integrally formed by insert molding around the spray plate 35. Thus, the spray plate 35, the compartment cylinder 323, and the cap 33 are integrated with each other by insert molding.

With the cap 33 being screwed at the opening of the head portion 31, the spray portion 32 is attached to the shower device main body 1.

A partition portion 11 for controlling the flow of fluid is provided inside the head portion 31. The partition portion 11, which constitutes a part of the shower device main body 1, may be integrated with the head portion 31, but is provided separately in this embodiment.

As shown in FIGS. 3 to 7, the partition portion 11 is generally circular in plan view, and includes, at the center, a circular water passage hole 112 through which liquid (hot and cold water) can flow. The water passage hole 112 can constantly flow water from upstream to downstream. Guide grooves 115 for guiding water to the water passage hole 112 are provided on both sides of the water passage hole 112. The guide grooves 115 can guide a predetermined amount of water to the water passage hole 112.

The partition portion 11 includes, at a first end thereof, a circular valve hole 111 through which hot and cold water can flow. A valve seat 114 such as an O-ring is provided in the valve hole 111. A ball valve 2 which serves as a valve body is detachably seated on the valve seat 114. The ball valve 2, when seated on the valve seat 114, prevents liquid from flowing into the valve hole 111. The ball valve 2, when detached from the valve seat 114, allows liquid to flow into the valve hole 111. In this manner, this structure functions as a valve device.

Further, on a downstream side of the partition portion 11, a partition cylinder 116 is provided in a cylindrically projecting fashion and surrounds the water passage hole 112. The partition cylinder 116 separates a water flow through the water passage hole 112 and a water flow through the valve hole 111 from each other. In the state where the spray portion 32 is attached to the opening of the head portion 31, the partition cylinder 116 is fitted by insertion in the compartment cylinder 323 of the spray portion 32 via an O-ring. With this structure, water passing through the central water passage hole 112 is not directed to the shower spray zone 322 but is sprayed from the high-speed spray zone 321. On the other hand, water passing through the valve hole 111 is not directed to the high-speed spray zone 321 but is sprayed from the shower spray zone 322.

In the partition portion 11, a pivot axis 113 is provided in a standing manner at the first end, and a latch wall 43 which constitutes a regulating means 4 to be described later is provided at the second end. A link lever 12 is pivotally held on the pivot axis 113 in a freely rotating manner. In the present embodiment, the link lever 12 is pivotally held on the pivot axis 113 which projects from the partition portion 11, but may be pivotally attached to the partition portion 11 by an axial component projecting from the link lever 12.

The link lever 12 is generally T-shaped in plan view. At a first end thereof, the link lever 12 is provided with a pivot hole 122 for pivotally holding the pivot axis 113. A valve body retention hole 123, provided in the vicinity of the pivot hole 122, holds the ball valve 2 in a freely movable manner.

At a second end thereof, the link lever 12 is provided with a weight 121 and also with a latch pin 42 which restricts the rotational movement of the link lever 12 and which is equipped with a biasing means 41 such as a spring.

The link lever 12 rotates, for example, when the shower device is shaken or tapped lightly. The rotation of the link lever 12 acts on the ball valve 2 at the valve body retention hole 123 between the weight 121 and the pivot axis 113, and thereby moves the ball valve 2.

To be specific, when, for example, the shower device is shaken or tapped, the movement of the shower device is transmitted to the weight 121, and, by inertia, the weight 121 makes a relative movement to the partition portion 11 which is a part of the shower device main body 1. Along with this movement, the link lever 12 rotates around the pivot axis (pivot point) 113. In this link mechanism, the position of the center of gravity of the weight 121 acts as the point of effort, the pivot axis 113 acts as the fulcrum, and the retention hole 123 holding the ball valve 2 acts as the point of load. Hence, the movement of the weight 121 is transmitted to the point of load which is located such that the distance between the pivot point and the point of load is shorter than the distance between the point of effort and the pivot point, namely, the valve body retention hole 123. Eventually, the ball valve 2 is caused to move in the same direction as the rotation direction of the link lever 12.

To set the heaviness of the weight 121, the distance between the pivot point and the point of effort is multiplied with the weight of the ball valve 2. The product of the multiplication is divided by the distance between the pivot point and the point of load. Then, the heaviness of the weight 121 is set greater than the quotient. The weight 121 having such heaviness can reliably transmit the movement of the weight 121 to the ball valve 2, and can thereby cause the movement of the ball valve 2.

The link lever 12 is further provided, at its first end, with a flat plate-like holddown member 124 via a support rod. The holddown member 124 holds down the ball valve 2 so as to prevent the ball valve 2 from popping out of the retention hole 123 in the link lever 12 beyond a predetermined range. As a result, the ball valve 2 can move integrally along with the movement of the link lever 12. Incidentally, the weight 121 is fixedly screwed on the link lever 12, but may be fixed by an adhesive agent, welding or other means. As a further alternative, the link lever 12 may be made of metal and integrally molded with the weight.

The ball valve 2 which opens and closes the valve hole 111 moves integrally in the directions of rotation of the link lever 12, with the point of load being located at a point where the ball valve 2 is in contact with a part of the link lever 12 around the valve body retention hole 123. As an example of the valve body, the present embodiment employs the ball valve 2 of globular shape. Instead, the valve body may be of spherical shape, substantially bombshell-like shape, substantially conical shape or the like, as far as the valve body can make a tight contact with the valve seat 114 and can block the flow of water into the valve hole 111.

The regulating means 4 prevents unintentional unwanted rotation of the link lever 12, and thereby prevents the ball valve 2 in the valve-open state from closing the valve hole 111 or prevents the ball valve 2 in the valve-closed state from unintentionally opening the valve hole. The regulating means in the present embodiment is composed of the latch pin 42 and the latch wall 43. Provided at an extreme end of the link lever 12, the latch pin 42 is equipped with the biasing means 41 which is a spring for providing a biasing force in an opposite direction to the pivot axis 113. Provided on the partition portion 11, the latch wall 43 has a valve-open position latch recess 432 and a valve-closed position latch recess 433, each of which is arranged to be latched with a latch pin 42 and is formed in a curved latch surface 431 along which the distance from the pivot axis 113 varies.

In the valve-open state shown in FIG. 7(a), the latch pin 42 is latched in the valve-open position latch recess 432 in the latch surface 431. In the valve-closed state shown in FIG. 7(c), the latch pin 42 is latched in the valve-closed position latch recess 433 in the latch surface 431. The valve-open position latch recess 432 and the valve-closed position latch recess 433 in the latch surface 431 are separated by a bump where the distance from the pivot axis 113 is smaller. Hence, the valve-open state and the valve-closed state do not change over each other unless the weight 121 is subjected to a force that is strong enough to cause the latch pin 42 to climb over the bump against the biasing force of the biasing means 41.

With the above-mentioned arrangements, the following movements occur when the shower device changes over from the valve-open state to the valve-closed state, as illustrated in FIGS. 7(a)-(c).

In the valve-open state shown in FIG. 7(a), the shower device main body 1 is caused to move by an external energy given to the shower device main body 1 by shaking, swinging, turning, tilting, tapping or otherwise operating the shower device main body 1. Then, the partition portion 11 which constitutes a part of the shower device main body 1 moves together, and this movement is transmitted to the weight 121. If the force moving the shower device is greater than a predetermined level, the weight 121 makes a relative movement to (i.e. moves independently of) the shower device main body 1 by inertia. As illustrated in FIG. 7(b), this movement causes rotation of the link lever 12, with the weight 121 as the point of effort and the pivot axis 113 as the fulcrum. At the same time, a part of the link lever 12 around the valve body retention hole 123 acts as the point of load and transmits the force to the ball valve 2, so that the ball valve 2 is caused to move. During this process, the latch pin 42 leaves the valve-open position latch recess 432 in the latch surface 431, climbs over the bump against the biasing force of the biasing means 41, slides along the latch surface 431, and reaches the valve-closed position latch recess 433. FIG. 7(c) shows the valve-closed state in which the ball valve 2 is in tight contact with the valve seat 114 and stops water supply to the valve hole 111. In reverse, when the shower device changes over from the valve-closed state to the valve-open state, the movements occur in the order from FIG. 7(c) to FIG. 7(a).

According to the shower device in this embodiment, when the ball valve 2 opens the valve hole 111, water is sprayed from both the high-speed spray zone 321 and the shower spray zone 322, as in a spray pattern illustrated in FIG. 2(a). Hence, just like a standard shower head, the shower device can spray water to a relatively wide area such as the head and the body.

On the other hand, in the valve-closed state where the ball valve 2 closes the valve hole 111, water is sprayed only from the central high-speed spray zone 321 and not from the peripheral shower spray zone 322, as in a spray pattern illustrated in FIG. 2(b). Compared with the case where water is sprayed from both the high-speed spray zone and the shower spray zone, the spray action in the valve-closed state provides a smaller total opening area, reduces the amount of water to be sprayed, and advantageously saves water. In addition, the spray action in the valve-closed state occurs under an increased internal pressure and sprays water more powerfully, thus being effective for shampooing because a powerful spray is more likely to reach scalp pores.

For the above-mentioned reasons, the shower device in this embodiment is effectively applicable not only to a shower head for use in general homes but also to a shower head for use in hot springs and bathhouses or a shower head for use in barbers and hair salons.

Additionally, the head portion 31 may be partially or entirely made of a transparent member. By making a part of the head portion 31 transparent to such a degree as to make the internal weight 121 visible from the outside, it is possible to visualize whether the valve body is in the valve-open state or the valve-closed state, from the position of the weight 121.

Second Embodiment

Figure 8:
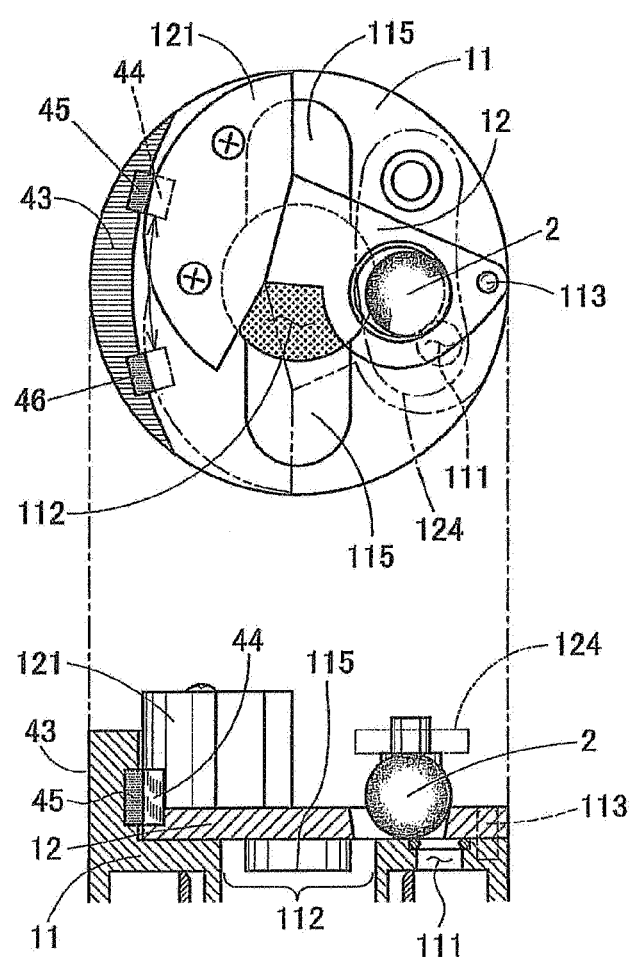
FIG. 8 shows a regulating means of the shower device, in a plan view and a sectional view, in the second embodiment of the present invention.

FIG. 8 shows, in a plan view, a principal part of the shower device in the second embodiment of the present invention. The basic arrangements of the shower device in this second embodiment may be the same as those of the shower device in the first embodiment, and hence description of the same arrangements is omitted. The second embodiment is distinguished by the structure of the regulating means 4.

In the first embodiment, the regulating means 4 includes the latch pin 42 having the biasing means 41, the valve-open position latch recess 432 and the valve-closed position latch recess 433. In the second embodiment, the regulating means employs magnets in order to prevent unintentional rotation of the link lever 12 and thereby to prevent the valve body from changing over from the valve-open state to the valve-closed state or from the valve-closed state to the valve-open state.

Specifically, as shown in FIG. 8, the regulating means in this embodiment is composed of a link lever-side magnet 44, a valve-open position latch magnet 45, and a valve-closed position latch magnet 46. The link lever-side magnet 44 is fixed at an end of the link lever 12 at which the weight 121 is provided, opposite to the pivot axis 113 that is pivotally held on the link lever 12. The valve-open position latch magnet 45 and the valve-closed position latch magnet 46 are mounted on a part of the latch surface 431 of the latch wall 43 which is provided in a standing manner on the partition portion 11.

In the valve-open state, the link lever-side magnet 44 is magnetically attracted to and latched with the valve-open position latch magnet 45. In the valve-closed state, as indicated by two-dotted broken lines in FIG. 8, the link lever-side magnet 44 is magnetically attracted to and latched with the valve-closed position latch magnet 46.

Since the link lever-side magnet 44 is magnetically attracted to the valve-open position latch magnet 45 or the valve-closed position latch magnet 46, the valve-open state and the valve-closed state do not change over each other unless the weight 121 is subjected to a force that is stronger than the magnetic attractive force.

Incidentally, in this embodiment, the link lever is provided with the magnet 44, and the latch wall 43 is provided with the magnets 45, 46. Alternatively, either of the link lever or the latch wall may be provided with a magnet or magnets, and the other one may be provided with a magnetic material or materials, in which case the magnet(s) and the magnetic material(s) are attracted to each other.

Third Embodiment

Figure 9:
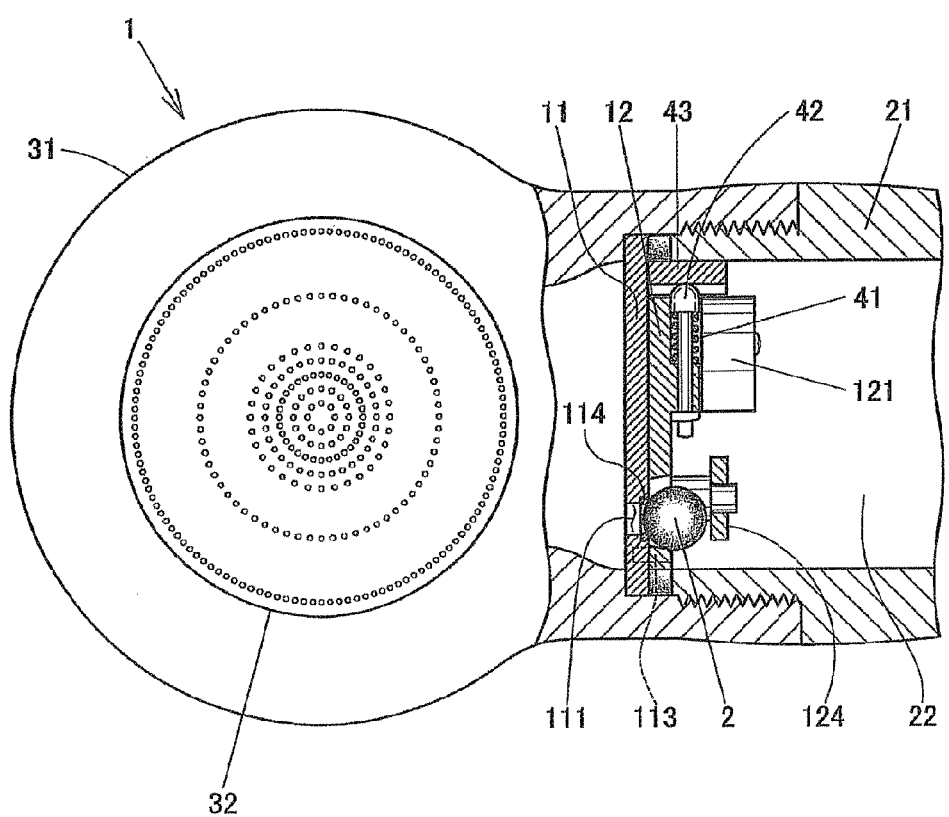
FIG. 9 is a partial sectional view of the shower device in the third embodiment of the present invention.

FIG. 9 is a cross section showing a principal part of the shower device in the third embodiment of the present invention. In the shower device in the third embodiment of the present invention, the partition portion 11 is provided in the grip portion 21. The partition portion 11 is equipped with the valve hole 111 for allowing the flow of water, the pivot axis 113 for pivotally holding the link lever 12 in a rotatable manner, and the latch wall 43 for regulating the rotation of the link lever 12 by being latched with the latch pin 42. The valve seat 114 such as an O-ring is provided in the valve hole 111. The ball valve 2 blocks the flow of water by making a tight contact with the valve seat 114.

In the third embodiment, when the shower device is caused to move by shaking, tapping or the like, the weight 121 makes a relative movement to the shower device by inertia. This movement causes the link lever 12 to rotate, which then causes the ball valve 2 to close the valve hole 111. In this valve-closed state, the spray action from the spray portion 32 having multiple holes is stopped. On the other hand, in the valve-open state where the valve hole 111 is not closed by the ball valve 2, water is sprayed from the spray portion 32 having multiple holes.

As described, the on/off state of the spray action can be changed over by a relative movement of the ball valve 2 by inertia which is caused by shaking, tapping, or otherwise operating the shower device. Hence, just like the shower head with a hand-operable water stop valve disclosed in Patent Literature 1, temporary stop and restart of the spray action can be easily changed over by a simple movement of the hand holding the shower device.

Fourth Embodiment

Figure 10:
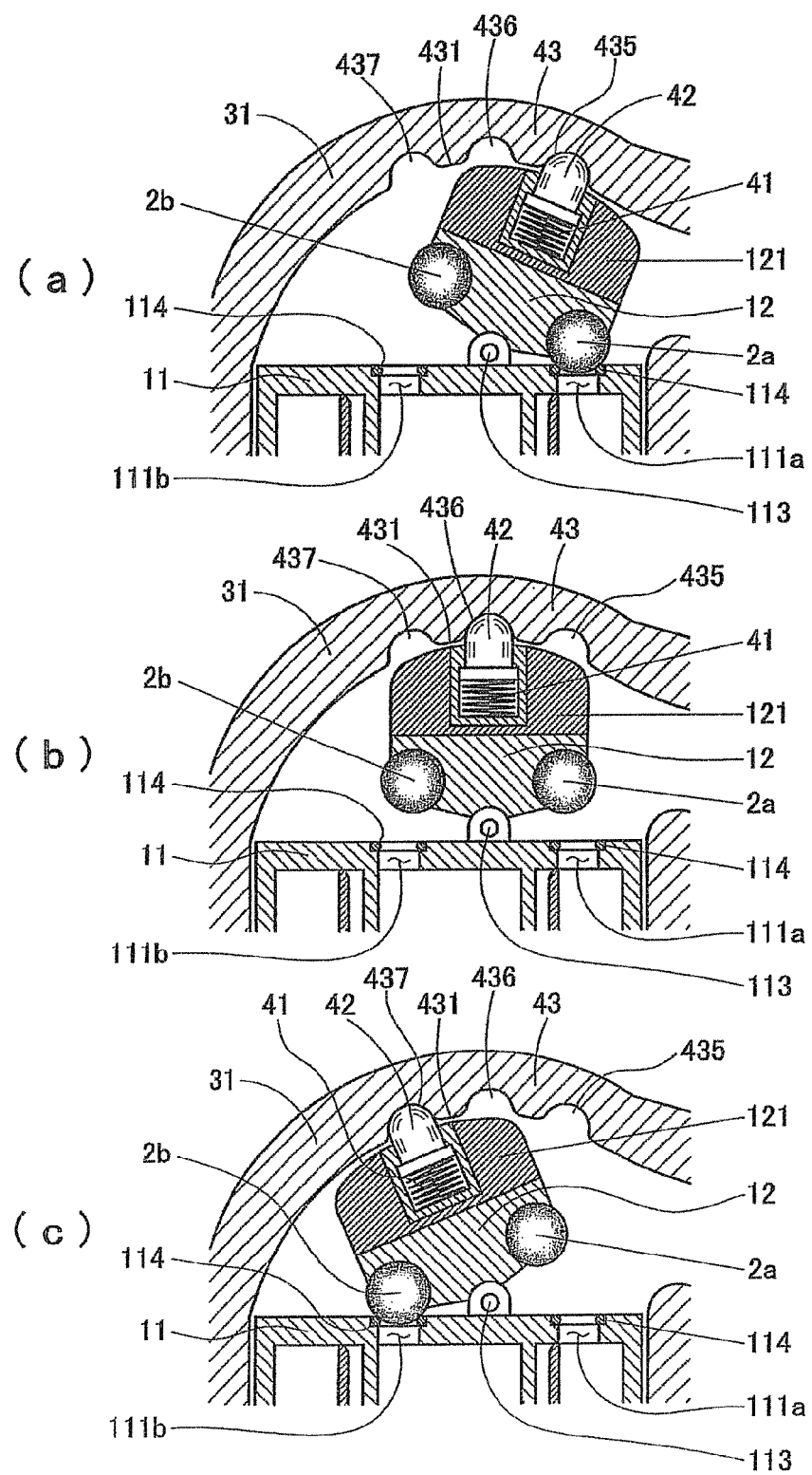
FIGS. 10(a)-(c) are sectional views showing the valve-open state and the valve-closed state of the shower device in the fourth embodiment of the present invention.
Figure 11:
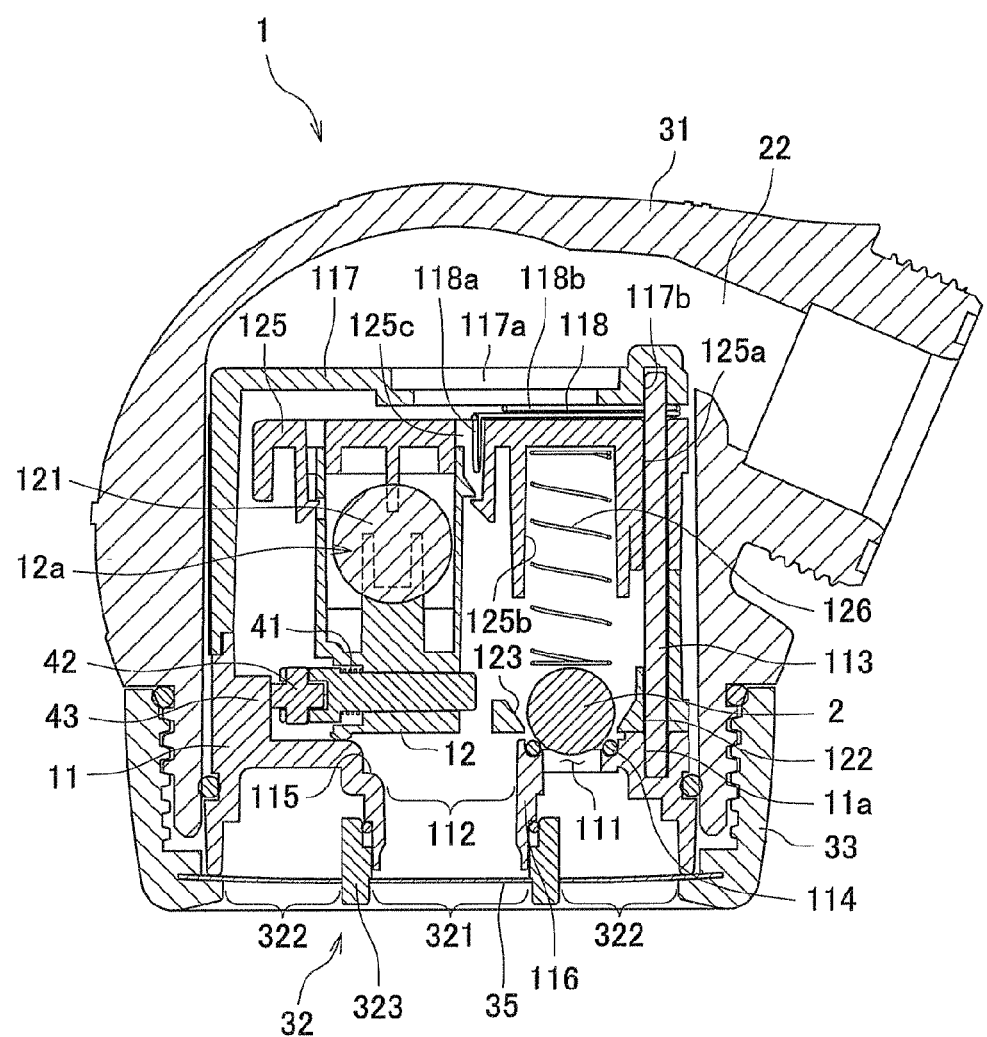
FIG. 11 is a sectional view of the shower device in the fifth embodiment of the present invention.
Figure 12:
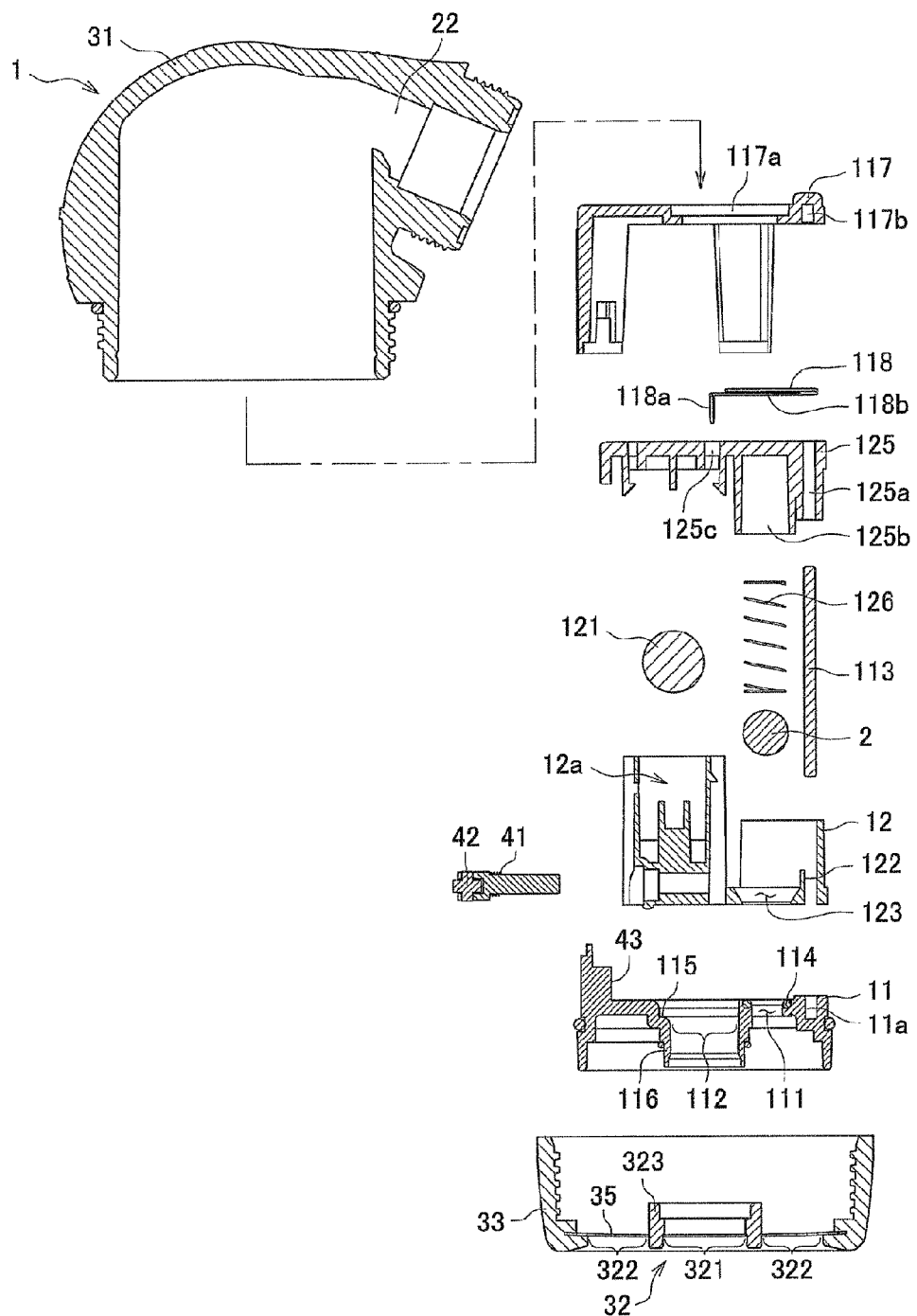
FIG. 12 is an exploded sectional view of the shower device in the fifth embodiment.

FIG. 10(*a*)-(*c*) are sectional views showing the fourth embodiment of the present invention. The partition portion 11 which constitutes a part of the shower device main body includes two valve holes 111*a*, 111*b* through which liquid can flow, and the pivot axis 113 for pivotally holding the link lever 12 in a rotatable manner. The valve seat 114 such as an O-ring is provided in each of the valve holes 111*a*, 111*b*. On the link lever 12, the weight 121 is provided at a position distant from the pivot axis 113, and ball valves 2*a*, 2*b* are retained at positions closer to the pivot axis 113. These ball valves 2*a*, 2*b* close the valve holes 111*a*, 111*b* by making a tight contact with the valve seats 114.

As the regulating means 4, the latch pin 42 equipped with the biasing means 41 which is a spring is provided in the link lever 12, and three latch recesses 435, 436 and 437 are formed in the latch surface 431 of the latch wall 43.

In FIG. 10(*a*), where the right ball valve 2*a* closes the right valve hole 111*a*, water can flow only through the left valve hole 111*b*. In FIG. 10(*b*), where neither of the ball valves 2*a*, 2*b* closes the corresponding valve holes 111*a*, 111*b*, water can flow through both of the valve holes 111*a*, 111*b*. In FIG. 10(*c*), where the left ball valve 2*b* closes the left valve hole 111*b*, water can flow only through the right valve hole 111*a*.

Since the two ball valves 2*a*, 2*b* can make a tight contact with the valve seats 114 and can close the corresponding two valve holes 111*a*, 111*b* in the valve-closed state, three valve-open modes are available in this embodiment: both of the valve holes 111*a*, 111*b* are in the valve-open state; the valve hole 111*a* is closed to be the valve-closed state; the valve hole 111*b* is closed to be the valve-closed state.

As a result, water can be sprayed from the spray portion in three spray patterns. Additionally, based on the first embodiment, this embodiment may be further arranged to change over a plurality of flow passages by providing two or more ball valves 2 and a plurality of valve holes 111.

Fifth Embodiment

Figure 13:
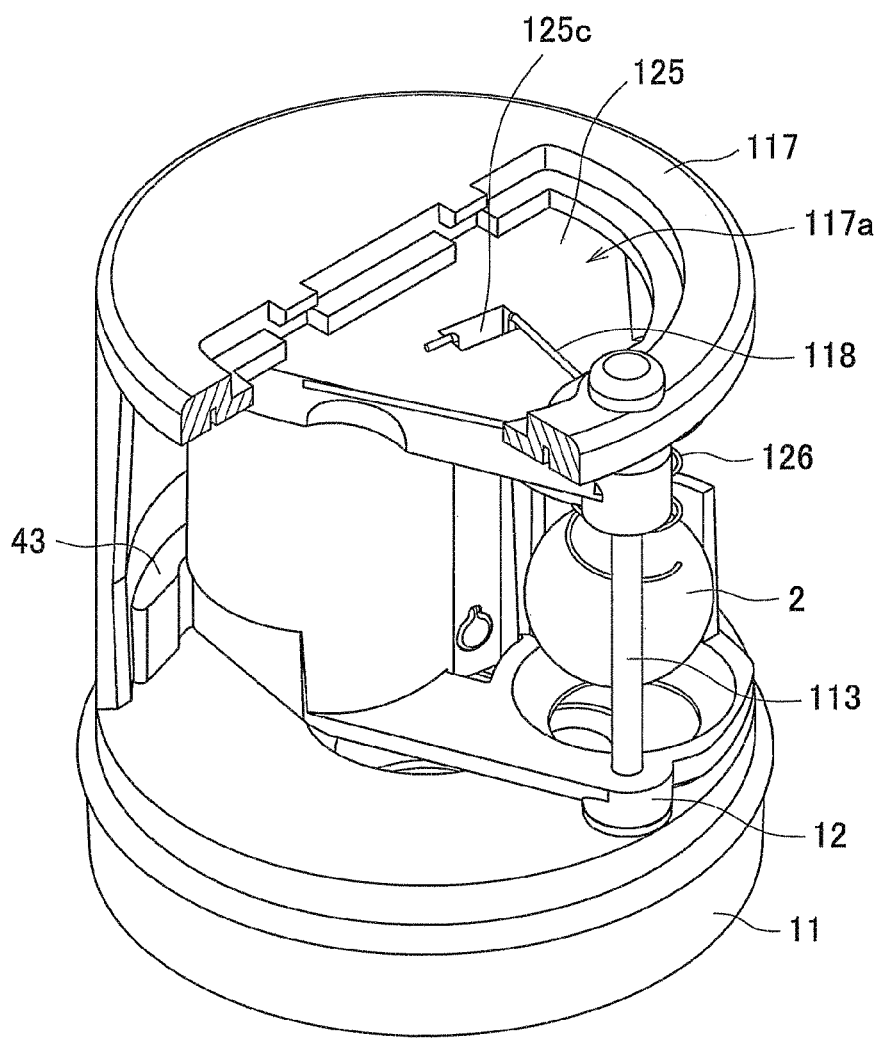
FIG. 13 is a perspective view of a principal part of the shower device in the fifth embodiment.
Figure 14:
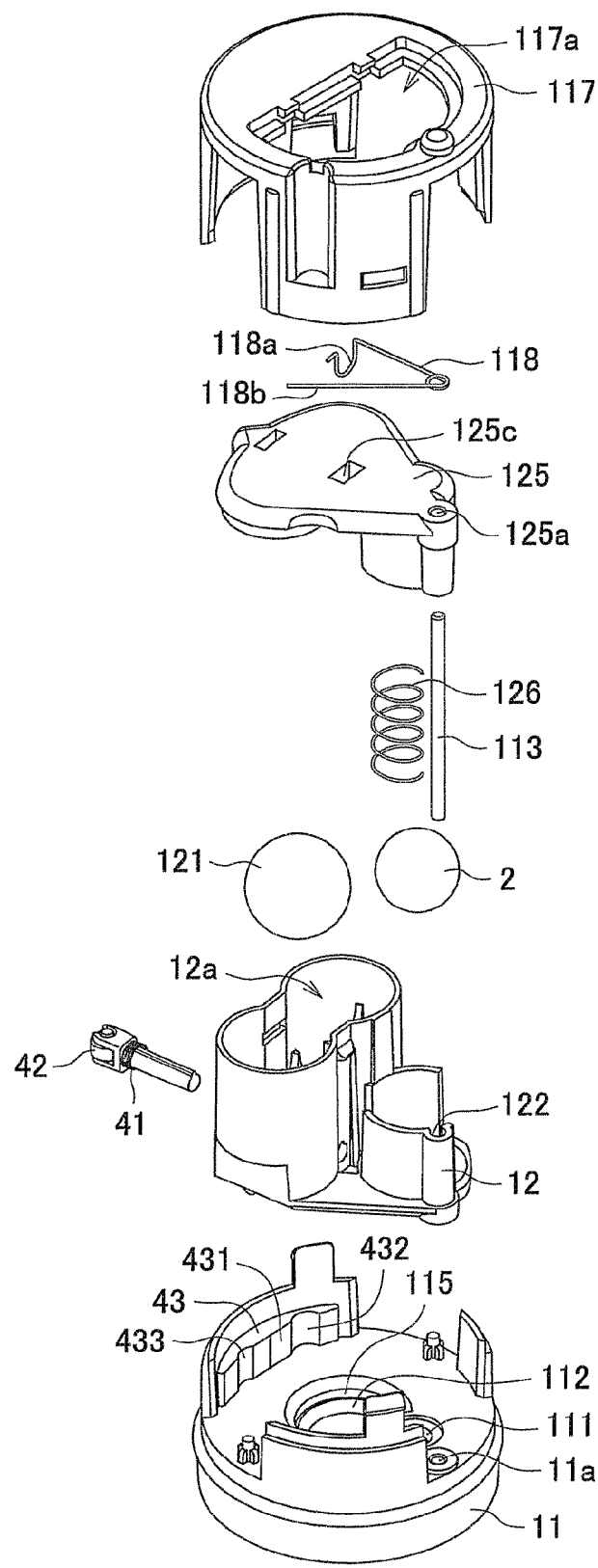
FIG. 14 is an exploded perspective view of the principal part of the shower device in the fifth embodiment.

FIGS. 11 to 15 show the shower device in the fifth embodiment of the present invention. The shower device in this embodiment has the same basic structure as the shower device of the first embodiment, but is distinguished by a torsion spring 118 which biases the link lever 12 constantly in the valve-opening direction and which also serves as the regulating means. In the following description, the members serving the same functions as in the first embodiment are indicated by the same numerals and are not described herein. For better visibility, FIG. 13 presents a cut-off model, with the partition portion 11 and the case 117 being partially cut off.

In the fifth embodiment, as shown in FIGS. 11 to 15, the case 117 is provided upstream of the partition portion 11. The case 117 is fixed on the partition portion 11 in an engaging manner, but may be fixed by an adhesive agent, welding, or other manner. Additionally, the case 117 may be made of a transparent resin or the like so as to make the inside visible.

The case 117 has a cylindrical shape with a bottom closed, and forms a space for accommodating the link lever 12 and other components between the case 117 and the partition portion 11. The case 117 has a semicircular opening 117*a* at its upstream end surface, and also has a plurality of spaced openings in the circumferential surface. With this structure, liquid from the water passage 22 flows into the space formed by the partition portion 11 and the case 117. The case 117 and the partition portion 11 are detachably fixed on the head portion 31.

The case 117 is provided with an axis-fixing recess 117*b*, and the partition portion 11 is provided with an axis-fixing recess 11*a*. The pivot axis 113 is fixed on the case 117 and the partition portion 11 by having an end thereof inserted in the axis-fixing recess 117*b* and having the other end inserted in the axis-fixing recess 11*a*. The pivot axis 113 is arranged on the stem side of the head portion 31 (on the side nearer the grip portion 21).

A housing 12*a* for accommodating the globular weight 121 is provided at the second end of the link lever 12. A cover 125 is provided on the upstream side of the link lever 12. The cover 125 is fixed on the link lever 12 in an engaging manner, but may be fixed by an adhesive agent, welding, or other manner.

The cover 125 is arranged to close the housing 12*a* for accommodating the weight 121. The cover 125 has a pivot hole 125*a* for pivotally holding the pivot axis 113, at a position corresponding to the pivot hole 122 of the link lever 12. Hence, the cover 125, together with the link lever 12, is pivotally supported on the pivot axis 113 in a freely rotating manner.

The cover 125 also has a spring-positioning recess 125*b* at a position corresponding to the valve body retention hole 123 of the link lever 12. A compression coil spring 126 is arranged in the spring-positioning recess 125*b* and urges the ball valve 2 toward the partition portion 11. According to this structure, when the ball valve 2 is displaced into the valve hole 111, the ball valve 2 is seated in the valve seat 114 without fail, irrespective of the water pressure.

The shower device in the fifth embodiment is also provided with the torsion spring 118 which biases the link lever 12 and the cover 125 constantly in the valve-opening direction. In this embodiment, the torsion spring 118 is employed as an example of the spring member for the present invention. However, this is not a limitative example and the spring member may be a leaf spring or the like.

The torsion spring 118 has a first end 118*a* engaged with an engagement recess 125*c* formed in the cover 125, and a second end 118*b* engaged with the inner circumferential surface of the case 117. The pivot axis 113 is arranged at a coil portion of the torsion spring 118. The torsion spring 118 biases the link lever 12 and the cover 125 constantly in the valve-opening direction against the partition portion 11 and the case 117. In this manner, the torsion spring 118 helps the ball valve 2 to open easily even when water pressure is applied to the ball valve 2 at the valve-closed position. Further, the torsion spring 118 prevents unwanted rotation of the link lever 12 while the ball valve 2 in the valve-open orientation.

Figure 15:
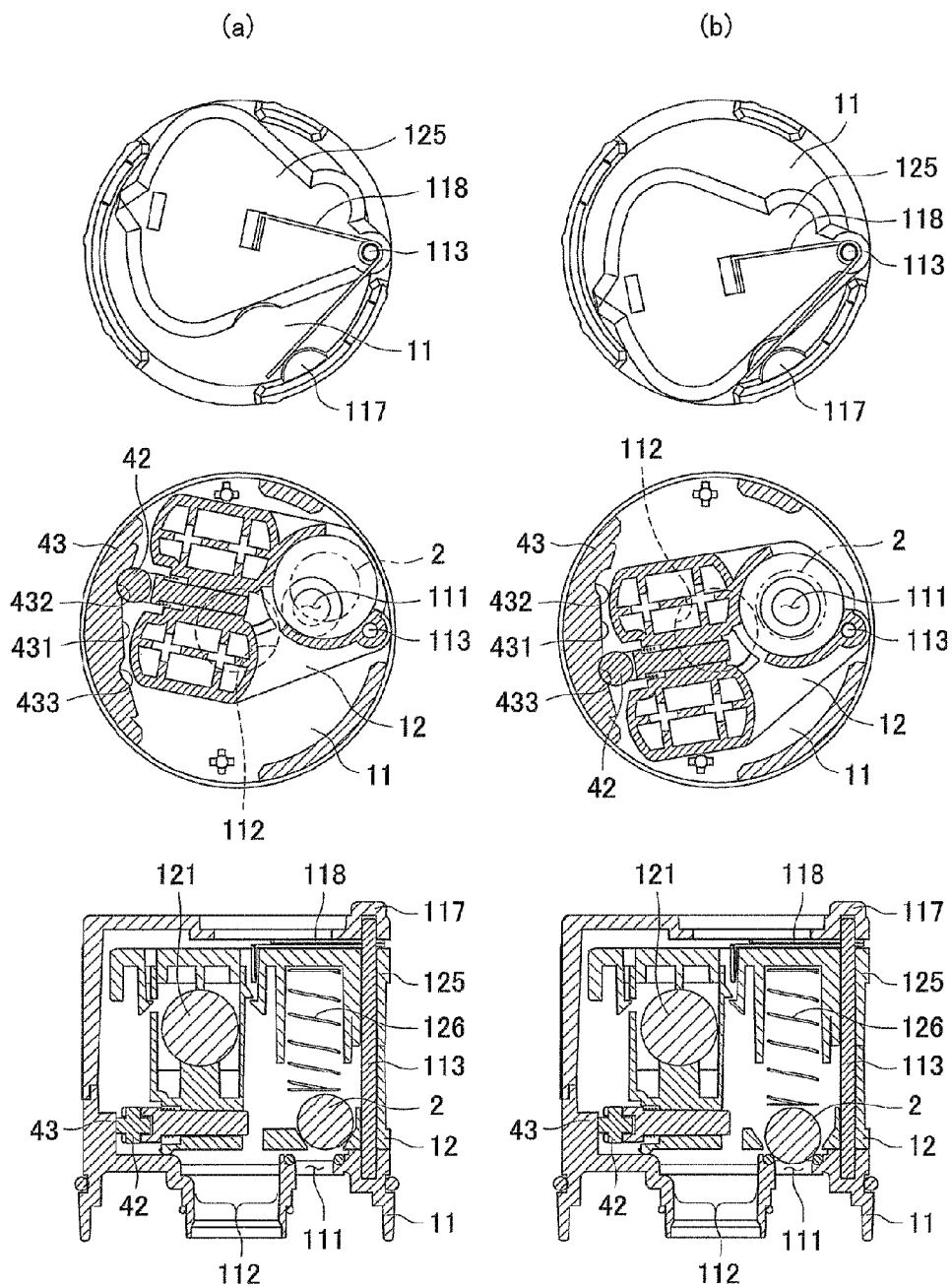
FIGS. 15(a) and (b) are plan views and sectional views showing the valve-open state and the valve-closed state of the shower device in the fifth embodiment.

In the valve-open state shown in FIG. 15(*a*), the latch pin 42 is latched in the valve-open position latch recess 432, and the link lever 12 and the cover 125 are biased in the valve-opening direction by the torsion spring 118. Hence, the valve-open state is maintained unless the weight 121 is subjected to a force which is greater than a resistant force by the biasing means 41 which biases the latch pin 42 and by the torsion spring 118. This arrangement can prevent unintentional activation of the link lever 12 and the cover 125.

When the shower device main body 1 is shaken, swung, turned, tilted, tapped or operated otherwise and gives the weight 121 a force greater than a first predetermined value, the link lever 12 and the cover 125 rotate relative to the partition portion 11 and the case 117. Then, as shown in FIG. 15(*b*), the ball valve 2 is seated in the valve seat 114 to be in the valve-closed state.

In the valve-closed state, the latch pin 42 is latched in the valve-closed position latch recess 433, and the ball valve 2 is pushed toward the valve seat 114 by the compression coil spring 126 and water pressure. In this situation, although the link lever 12 and the cover 125 are biased in the valve-opening direction by the torsion spring 118, the valve-closed state is maintained by the regulating means 4, the compression coil spring 126, and water pressure. As a result, this arrangement can prevent unintentional activation of the link lever 12 and the cover 125.

When the shower device main body 1 is shaken, swung, turned, tilted, tapped or operated otherwise and gives the weight 121 a force greater than a second predetermined value, the link lever 12 and the cover 125 rotate relative to the partition portion 11 and the case 117. Then, the ball valve can be brought back to the valve-open state. In this regard, the first predetermined value and the second predetermined value may be the same or different.

Furthermore, while in the valve-closed state, if the supply of fluid is stopped (the tap is turned off) and water pressure which pushes the ball valve 2 toward the valve seat 114 is released, the biasing force of the torsion spring 118 displaces the link lever 12 and the cover 125 in the valve-opening direction, against the latch pin 42 and the compression coil spring 126. As a result, the valve body turns into the valve-open state when the shower device is turned off, and remains in the valve-open state until the shower device is turned on. Eventually, when the shower device is turned on, both the high-speed spray zone 321 and the shower spray zone 322 are ready to spray water.

In the above embodiments, the weight 121 moves independently of the valve/shower device main body by inertia. Alternatively, the weight 121 may move independently of the valve/shower device main body by gravity.

The fifth embodiment utilizes a combination of the compression coil spring 126 and the regulating means 4. Alternatively, it is possible to employ either of the compression coil spring 126 or the regulating means 4, or to employ neither of the compression coil spring 126 nor the regulating means 4.

The valve device according to claim 1 of the present invention is similar to the shower device in the third embodiment. The valve device includes a valve device main body (which corresponds to the shower device main body 1) and a fluid passage (water passage 22) provided therein. A valve hole 111, formed in the fluid passage, is opened and closed by the valve body (ball valve 2). The link lever 12 is pivotally held in the valve device main body 1, and is equipped with the weight 121 which serves as the point of effort. The valve body 2 is provided at such a position that the distance between the pivot point of the link lever 12 and the valve body 2 is shorter than the distance between the weight 121 and the pivot point of the link lever 12.

DESCRIPTION OF THE REFERENCE NUMERALS 1 shower device main body
11 partition portion
11a axis-fixing recess
111 valve hole
112 water passage hole
113 pivot axis
114 valve seat
115 guide groove
116 partition cylinder
117 case
117a opening
117b axis-fixing recess
118 torsion spring (spring member)
118a first end
118b second end
12 link lever
12a housing
121 weight
122 pivot hole
123 valve body retention hole
124 holddown member
125 cover
125a pivot hole
125b spring-positioning recess
125c engagement recess
126 compression coil spring
2 ball valve (valve body)
21 grip portion
22 water passage
31 head portion
32 spray portion
321 high-speed spray zone
322 shower spray zone
323 compartment cylinder
33 cap
35 spray plate
4 regulating means
41 biasing means
42 latch pin
43 latch wall
431 latch surface
432 valve-open position latch recess
433 valve-closed position latch recess
435 latch recess
436 latch recess
437 latch recess
44 link lever magnet
45 valve-open position latch magnet
46 valve-closed position latch magnet

The invention claimed is:

1. A valve device comprising a valve device main body, a fluid passage provided in the valve device main body and having a valve hole, and a valve body for opening and closing the valve hole,
wherein
the valve device further comprises a link lever which is pivotally held in the valve device main body and which is equipped with a weight serving as a point of effort,
the valve body is provided at such a position that a distance between a pivot point of the link lever and the valve body is shorter than a distance between the weight and the pivot point of the link lever, and
when the valve device main body is caused to move, the movement of the valve device main body causes the weight to make a relative movement to the valve device main body, the movement of the weight causes the link lever to make a rotational movement, and the rotational movement of the link lever causes a movement of the valve body to open or close the valve hole.

2. A shower device comprising a shower device main body, a water passage provided in the shower device main body and having a valve hole, and a valve body for opening and closing the valve hole,
wherein
the shower device further comprises a link lever which is pivotally held in the shower device main body and which is equipped with a weight serving as a point of effort,
the valve body is provided at such a position that a distance between a pivot point of the link lever and the valve body is shorter than a distance between the weight and the pivot point of the link lever, and
when the shower device main body is caused to move, the movement of the shower device main body causes the weight to make a relative movement to the shower device main body, the movement of the weight causes the link lever to make a rotational movement, and the rotational movement of the link lever causes a movement of the valve body to open or close the valve hole.

3. A shower device comprising: a shower device main body having a spray portion, the spray portion including a central high-speed spray zone and a peripheral shower spray zone; a passage for supplying water to each of the high-speed spray zone and the shower spray zone, having a valve hole provided at a part communicating to the shower spray zone; and a valve body for opening and closing the valve hole,
when the valve body opens the valve hole, the shower device allowing water to flow out from both of the high-speed spray zone and the shower spray zone, and when the valve body closes the valve hole, the shower device allowing water to flow out only from the high-speed spray zone,
wherein
the shower device further comprises a link lever which is pivotally held in the shower device main body and which is equipped with a weight serving as a point of effort,
the valve body is provided at such a position that a distance between a pivot point of the link lever and the valve body is shorter than a distance between the weight and the pivot point of the link lever, and when the shower device main body is caused to move, the movement of the shower device main body causes the weight to make a relative movement to the shower device main body, the movement of the weight causes the link lever to make a rotational movement, and the rotational movement of the link lever causes a movement of the valve body to open or close the valve hole.

4. The valve device according to claim 1, wherein the valve body is a ball valve which is held by the link lever in a freely movable manner, the ball valve moving integrally along with the rotational movement of the link lever and being detachably seated in the valve hole at a position facing the valve hole.

5. The valve device according to claim 1, further comprising a regulating means which prevents, even if the valve device main body is caused to move while the valve body is at a valve-open position, an unwanted rotational movement of the link lever and an associated movement of the valve body toward the valve hole.

6. The valve device according to claim 5, wherein the regulating means comprises a latch pin and a latch recess, the latch pin being provided on either of the link lever or the valve device main body and having a biasing means, and the latch recess being provided in the other one of the link lever or the valve device main body and in which the latch pin latches detachably.

7. The valve device according to claim 5, wherein the regulating means comprises at least one magnet by which either of the link lever or the weight and the valve device main body are magnetically attracted to each other.

8. The valve device according to claim 5, wherein the regulating means comprises a spring member which biases the link lever constantly in the valve-opening direction, irrespective of whether the valve body is at the valve-open position or at a valve-closed position.

9. The shower device according to claim 2, wherein the valve body is a ball valve which is held by the link lever in a freely movable manner, the ball valve moving integrally along with the rotational movement of the link lever and being detachably seated in the valve hole at a position facing the valve hole.

10. The shower device according to claim 2, further comprising a regulating means which prevents, even if the shower device main body is caused to move while the valve body is at a valve-open position, an unwanted rotational movement of the link lever and an associated movement of the valve body toward the valve hole.

11. The shower device according to claim 10, wherein the regulating means comprises a latch pin and a latch recess, the latch pin being provided on either of the link lever or the shower device main body and having a biasing means, and the latch recess being provided in the other one of the link lever or the shower device main body and in which the latch pin latches detachably.

12. The shower device according to claim 10, wherein the regulating means comprises at least one magnet by which either of the link lever or the weight and the shower device main body are magnetically attracted to each other.

13. The shower device according to claim 10, wherein the regulating means comprises a spring member which biases the link lever constantly in the valve-opening direction, irrespective of whether the valve body is at the valve-open position or at a valve-closed position.

14. The valve device according to claim 4, further comprising a regulating means which prevents, even if the valve device main body is caused to move while the valve body is at a valve-open position, an unwanted rotational movement of the link lever and an associated movement of the valve body toward the valve hole.

15. The valve device according to claim 14, wherein the regulating means comprises a latch pin and a latch recess, the latch pin being provided on either of the link lever or the valve device main body and having a biasing means, and the latch recess being provided in the other one of the link lever or the valve device main body and in which the latch pin latches detachably.

16. The valve device according to claim 14, wherein the regulating means comprises at least one magnet by which either of the link lever or the weight and the valve device main body are magnetically attracted to each other.

17. The valve device according to claim 14, wherein the regulating means comprises a spring member which biases the link lever constantly in the valve-opening direction, irrespective of whether the valve body is at the valve-open position or at a valve-closed position.

18. The shower device according to claim 3, wherein the valve body is a ball valve which is held by the link lever in a freely movable manner, the ball valve moving integrally along with the rotational movement of the link lever and being detachably seated in the valve hole at a position facing the valve hole.

19. The shower device according to claim 3, further comprising a regulating means which prevents, even if the shower device main body is caused to move while the valve body is at a valve-open position, an unwanted rotational movement of the link lever and an associated movement of the valve body toward the valve hole.

20. The shower device according to claim 9, further comprising a regulating means which prevents, even if the shower device main body is caused to move while the valve body is at a valve-open position, an unwanted rotational movement of the link lever and an associated movement of the valve body toward the valve hole.

* * * * *